United States Patent [19]

Peiffer et al.

[11] Patent Number: 4,540,496
[45] Date of Patent: Sep. 10, 1985

[54] INTRAMOLECULAR POLYMER COMPLEXES - VISCOSIFIERS FOR HIGH IONIC STRENGTH DRILLING FLUIDS

[75] Inventors: Dennis G. Peiffer, East Brunswick; Robert D. Lundberg, Bridgewater, both of N.J.; Thad O. Walker, Humble, Tex.; S. Richard Turner, Rochester, N.Y.

[73] Assignee: Exxon Research & Engineering Company, Florham Park, N.J.

[21] Appl. No.: 478,683

[22] Filed: Mar. 25, 1983

[51] Int. Cl.³ ............................................... C09K 7/02
[52] U.S. Cl. .............................. 252/8.5 A; 252/8.5 C
[58] Field of Search ........................ 252/8.5 C, 8.5 A

[56] References Cited

U.S. PATENT DOCUMENTS

| | | | |
|---|---|---|---|
| 2,650,905 | 9/1953 | Fordyce et al. | 252/8.5 |
| 2,718,497 | 9/1955 | Oldham et al. | 252/8.5 |
| 3,025,234 | 3/1962 | Canterino | 252/8.5 |
| 4,048,077 | 9/1977 | Engelhardt et al. | 252/8.5 |
| 4,293,427 | 10/1981 | Lucas et al. | 252/8.5 |
| 4,357,285 | 11/1982 | Engelhardt et al. | 252/8.5 |
| 4,455,240 | 6/1984 | Costello | 252/8.5 |

Primary Examiner—Herbert B. Guynn
Attorney, Agent, or Firm—Richard E. Nanfeldt

[57] ABSTRACT

A new family of terpolymers based on acrylamide/sodium styrene sulfonate/methacrylamidopropyltrimethylammonium chloride has been found to be an improved viscosity control additive for water-based drilling muds. The resultant muds display good viscosity characteristics, thermal stability and gel strength when formulated from the terpolymer intramolecular complex having the appropriate polymer concentration and salt level.

5 Claims, No Drawings

INTRAMOLECULAR POLYMER COMPLEXES - VISCOSIFIERS FOR HIGH IONIC STRENGTH DRILLING FLUIDS

FIELD OF THE INVENTION

A new family of viscosification agents based on terpolymers of acrylamide-sodium styrene sulfonatemethacrylamidopropyltrimethylammonium chloride is described as an improved viscosity control additive for water-based drilling muds. The present invention relates to these terpolymer materials which function as viscosification agents when added to water-based muds which are fluids used to maintain pressure, cool drill bits and lift cuttings from the holes in the drilling operation for oil and gas wells. The terpolymers have about 40 to 98 mole % acrylamide units, about 1 to about 50 mole % sodium styrene sulfonate units and about 1 to about 50 mole % methacrylamidopropyltrimethylammonium chloride units. Normally, the latter two units comprise less than 60 mole % of the total polymer composition. A soluble, low molecular weight acid, base or salt can be added to the aqueous mud solution, wherein the rheological properties of the drilling fluid is markedly enhanced.

The drilling muds formed from these polymeric materials exhibit improved low and high temperature rheological properties as compared to drilling muds formed from homogeneous-charged polymers, i.e., polyelectrolytes.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes, and vary in composition over a wide spectrum. Generally, drilling muds are based on aqueous formulations or oil-based formulations.

A conventional water-based drilling mud formulation is comprised of basically the following ingredients: water, a clay such as bentonite, lignosulfonate, a weighting agent such as $BaSO_4$ (Barite), and a caustic material such as sodium hydroxide and a caustic material such as caustic barite, to adjust the pH of the drilling mud to a pH of about 10 to about 10.5.

In addition to cooling the drill bit and sweeping out the drilling fines from the vicinity of bit, the muds are capable of imparting a substantial positive pressure on a formation through its high density. This latter feature is due to the addition of high concentrations of insoluble, solid, high density particulates (i.e., weighting agents) such as barite. However, these particulates inhibit the drilling rate and possibly damage a variety of underground formations. This problem becomes even more acute as the drilling fines are "introduced" into the mud. Therefore, there has been a substantial need for a homogeneous, high density drilling mud which exhibits good performance at both high temperature and high ionic strength.

As alluded to previously, a very desirable change in the formulation of a drilling fluid would be the elimination of all added particulates. One practical approach to this problem is to formulate a drilling fluid that is clear, homogeneous, dense, single phase and possesses the appropriate viscosity requirements (in general, 40 to 50 cps). Therefore, a water-based mud containing principally a polymeric viscosifier in a high concentration brine (weighting agent) could meet the above-stated requirements. Such a fluid would be quite economical since some processing steps (and materials) are eliminated. For instance, brine can be obtained directly at the drill site.

However, it should be pointed out that the ability of macromolecules to effectively viscosify a high ionic strength solution is generally poor, since the dimensions of the polymer chains tend to collapse under these conditions. This is especially true for polyelectrolytes (i.e., homogeneous-charged polymers). A collapse in the dimensions of the chain results in significant loss in viscosity. Therefore, it is imperative for successful use of polymers in high ionic strength solutions that chain expansion rather than contraction should take place. Polymeric materials composed of acrylamide (AM), sodium styrene sulfonate (SSS) and methacrylamidopropyltrimethylammonium chloride (MAPTAC) were observed to enhance the viscosity of aqueous solutions containing high levels of salt, acid or, base. (The specific details regarding synthesis and physical properties are found in Patent Application No. 478,657, filed Mar. 25, 1983, now U.S. Pat. No. 4,461,884.) These materials meet the requirements for producing a homogeneous, single phase, high density, water-based drilling mud.

There has been substantial need for a water-based drilling fluid which would exhibit good performance at high temperature. Previous experience has shown that most polymeric viscosifiers are effective in salt-free (i.e., fresh water) systems; however, they lose their effectiveness upon the addition of salt. As the temperature is increased, the viscosity loss becomes even more pronounced. There is need, therefore, for a polymeric viscosifier which can maintain viscosity and gel strength in high ionic strength, weighing agent-free (or at low concentrations), water-based muds up to high temperatures (exceeding 300° F.). These needs are not adequately met by the current viscosifiers.

This invention describes an approach to viscosification of water-based drilling muds which permits the substitution of acrylamide-based polyampholyte terpolymers for amine clays and barite (weighting agent). The resulting polymer-modified drilling fluid displays rheological properties which are in a desirable range for drilling mud applications, based on tests conducted for 16 hours at a variety of temperatures.

The types of acrylamide-based polyampholytes that are envisioned in the present invention include acrylamide as the nonionic monomer unit and the following anionic and cationic species:

Anionic: 2-acrylamido-2-methylpropane sulfonic acid, sodium styrene sulfonate, (meth)acrylic acid, 2-sulfoethylmethacrylate and the like.

Cationic: Methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride and the like.

These monomers possess the appropriate water solubility so that polymerization can take place.

The preferred species of the instant invention is low to moderate charge density polyacrylamide-based polyampholytes with approximately 1 to about 60 mole % ionic groups. A 1:1 molar ratio of anionic and cationic is not required for effective utilization of this polymer. It is found that these terpolymers are soluble (low charge density) or readily dispersible (moderate charge density) in fresh water systems. Homogeneous, clear solutions form with the addition of soluble acid, base, or salt showing that the polymer is readily soluble in these solutions. In addition, the viscosity increases with the addition of these solutes. As a consequence, these polymers are extremely effective viscosifiers in a high ionic strength, water-based mud, even at relatively low levels. In the case of salt water, the concentration of salt can be from about 0.1 to about 50 grams per 100 grams of water.

SUMMARY OF THE INVENTION

A new family of viscosification agents based on terpolymers of acrylamide-sodium styrene sulfonatemethacrylamidopropyltrimethylammonium chloride is described an an improved viscosity control additive for water-based drilling muds. The present invention relates to these terpolymer materials which function as viscosification agents when added to water-based muds which are fluids used to maintain pressure, cool drill bits and lift cuttings from the holes in the drilling operation for oil and gas wells. The terpolymers have about 40 to 98 mole % acrylamide units, about 1 to about 50 mole % sodium styrene sulfonate units and about 1 to about 50 mole % methacrylamidopropyltrimethylammonium chloride units. Normally, the latter two units comprise less than 60 mole % of the total polymer composition. A soluble, low molecular weight acid, base or salt can be added to the aqueous mud solution, wherein the rheological properties of the drilling fluid is markedly enhanced.

GENERAL DESCRIPTION

The present invention describes a new class of viscosification agents for water-based drilling muds which are used during operation of gas and oil wells, wherein these viscosification agents are intermolecular complexes, i.e., polyampholytes containing primarily acrylamide with low to moderate concentrations of anionic and cationic groups. These latter two units are not necessarily present in a 1:1 molar ratio. Typically, the cationic monomer unit is methacrylamidopropyltrimethylammonium chloride (MAPTAC) and the anionic monomer unit is sodium styrene sulfonate (SSS). However, many water soluble anionic and cationic monomer units can be substituted for MAPTAC and SSS units. It is the placement of these oppositely-charged species onto the polymer chain that imparts substantially different physical properties to these materials, as compared to homogeneous-charged macromolecules, i.e., polyelectrolytes.

The water-based drilling muds of the instant invention minimally comprise, but can also include other additives, if necessary, an aqueous liquid such as fresh water or salt water; a clay such as bentonite; lignosulfonate as a viscosifier; a weighting material such as barite (BaSO$_4$), and a caustic material such as a sodium hydroxide or lime added to adjust pH to about 10.0 to 10.5. In general, the specific gravity is about 7 pounds per gallon to about 20 pounds per gallon, more preferably about 10 to 18, and most preferably about 12 to about 16.

A typical, but non-limiting example of a caustic material which can be readily employed is sodium hydroxide or lime.

A typical, but non-limiting example of a suitable clay additive is bentonite.

A typical, but non-limiting examples of a weighting agent which can be readily employed is barite or a barium sulfate, which may optionally be surface treated with a variety of other cations, such as calcium.

The terpolymers are formed by a free radical copolymerization process. The principal monomer used in the free radical aqueous solution copolymerization process is acrylamide monomer, which is copolymerized with an anionic monomer (typically, sodium styrene sulfonate) and a cationic monomer (typically, methacrylamidopropyltrimethylammonium chloride).

A typical water-based drilling mud, as evisioned by the instant invention, comprises water or salt water; weighting material necessary to give the desired mud density; about 0.25 to about 15 lb/bbl. of the acrylamide/sodium styrene sulfonate/methacrylamidopropyltrimethylammonium chloride intrapolymer complex; and sufficient concentration of base to adjust the pH of the water-based drilling mud to about 10.0 to about 10.5. Higher levels of the sulfonated polymer can be employed but it is not normally economically attractive. The drilling mud may also contains a clay such as Bentonite, at a concentration level of about 4 to about 30 lb/bbl., wherein the clay is added to the drilling mud to promote circulation and improve hole stability and cleaning. A lignosulfonate, which is a deflocculation agent, can be added to the drilling mud at a concentration level of about 1 to about 30 lb/bbl.

Alternatively, a typical water-based drilling mud, as envisioned by the instant invention, comprises water in which sufficient salt (such as non-chloride, iron bromide and calcium bromide) is dissolved to give the desired mud density, and about 0.25 to about 5 lb/bbl of the acrylamide-MAPTAC-SSS-terpolymer. Higher levels of the terpolymer can be employed, but, it is not economically attractive. The mud may contain a sufficient concentration of base to adjust the pH of the water-based mud to its appropriate level (normally 10.0 to 10.5). The attractive feature of this mud is the elimination of high concentrations of insoluble, solid, high density particulates (example, weighting agents). In some instances, these particulates inhibit the drilling process through damage of the underground formation and reduction in the drilling rate.

The terpolymers of the instant invention are formed by a free radical terpolymerization process in an aqueous medium of an acrylamide monomer, a sodium styrene sulfonate monomer and a methacrylamidopropyltrimethylammonium chloride monomer. The resultant water soluble terpolymer has the formula:

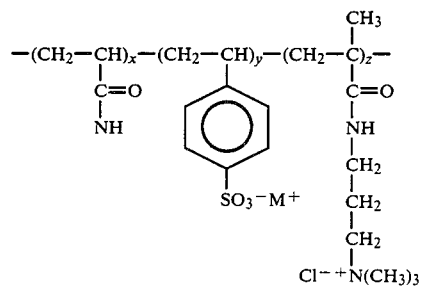

wherein x is about 40 to about 98 mole %, more preferably about 50 to about 95, and most preferably about 80 to about 90, y is about 1 to about 50 mole %, more preferably about 2 to about 20 and most preferably about 5 to about 10, and z is about 1 to about 50 mole %, more preferably about 2 to about 20, and most preferably about 5 to about 10, wherein y and z are less than 60 mole %, and M is an amine, or a metal cation selected from the group consisting of aluminum, iron, lead, Groups IA, IIA, IB and IIB of the Periodic Table of Elements wherein the terpolymer has about 1 to about 50 mole % of charged monomer units.

The molecular weight as derived from intrinsic viscosities, for the terpolymers of acrylamide/sodium styrene sulfonate/methacrylamidopropyltrimethylammonium chloride is about $10^3$ to about $5 \times 10^6$, more preferably about $10^4$ to about $2 \times 10^6$ and most preferably about $10^5$ to about $10^6$. The means for determining the molecular weights of the water soluble terpolymers from the viscosity of solutions of the terpolymers compresses the initial isolation of the water soluble terpolymers, purification and redissolving the terpolymers in water to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark Houwink relationship.

The water soluble terpolymers of acrylamide/sodium styrene sulfonate/methacrylamidopropyltrimethylammonium chloride are formed by a conventional free radical terpolymerization in an aqueous medium which comprises the steps of forming a reaction solution of acrylamide monomer, sodium styrene sulfonate monomer and methacrylamidopropyltrimethylammonium chloride monomer (50 wt. % solution in water) in distilled water, wherein the total monomer concentration is about 1 to about 40 grams of total monomer per 100 grams of water, more preferably about 5 to about 30, and most preferably about 10 to about 20; purging the reaction solution with nitrogen; adding sufficient acid to the reaction solution to adjust the pH of the reaction solution to about 4.5 to 5; heating the reaction solution to at least 55° C. while maintaining the nitrogen purge, adding sufficient free radical initiator to the reaction solution at 55° C. to initiate terpolymerization of the acrylamide monomer, the sodium styrene sulfonate monomer, and the methacrylamidopropyltrimethylammonium chloride monomer; terpolymerizing said monomers of acrylamide, sodium styrene sulfonate and methacrylamidopropyltrimethylammonium chloride at a sufficient temperature and for a sufficient period of time to form said water soluble terpolymer; and recovering said water soluble terpolymer from said reaction solution.

In general, the acrylamide, anionic and cationic monomers are dissolved in a water phase in the presence of an initiator, wherein the temperature is sufficient to initiate polymerization. The resultant terpolymer is added to the drilling mud formulation at about 0.5 to about 20 lb/bbl.

The total concentration of monomers in the water is about 1 to about 40 grams of total monomer per 100 grams of water, more preferably about 5 to about 30, and most preferably about 10 to about 20. Terpolymerization of the acrylamide monomer, sodium styrene sulfonate monomer, and methacrylamidopropyltrimethylammonium chloride monomer is effected at a temperature of about 30 to about 90, more preferably at about 40 to about 70, and most preferably at about 50 to about 60 for a period of time of about 1 to about 24 hours, more preferably about 3 to about 10, and most preferably about 4 to about 8.

A suitable method of recovery of the formed water soluble terpolymer from the aqueous reaction solution comprises precipitation in acetone, methanol, ethanol and the like.

Suitable free radical initiators for the free radical terpolymerization of the acrylamide monomers, the sodium styrene sulfonate monomer, and the methacrylamidopropyltrimethylammonium chloride monomer are selected from the group consisting of potassium persulfate, benzoyl peroxide, hydrogen peroxide, azobisisobutyronitrile and the like. The concentration of the free radical initiator is about 0.001 to about 2.0 grams of free radical initiator per 100 grams of total monomer, more preferably about 0.01 to about 1.0, and most preferably about 0.05 to about 0.1.

It should be pointed out that neither the mode of polymerization (solution, suspension, or emulsion polymerization technique and the like) nor the initiator is critical, provided that the method or the product of the initiation step does not inhibit production of the polyampholyte or chemically modify the initial molecular structure of the reacting monomers.

DESCRIPTION OF THE PREFERRED EMBODIMENTS

The following examples illustrate the present invention, without; however, limiting the same hereto.

EXAMPLE 1

Into a 1 liter—4 necked flash was added:
13.8 g. MAPTAC (50% water solution),
40.0 g. acrylamide,
6.44 g. sodium styrene sulfonate, and
300 ml. distilled water.

The pH of the solution was adjusted to 4.5 to 5.0 with 20% phosphonic acid solution. The solution was purged with nitrogen gas for 1 hour to remove dissolved oxygen. As the nitrogen gas purging began, the solution was heated to 55° C. At this point, 0.1 g. potassium persulfate was added to the solution. After 4 hours, the polymer was precipitated from solution with acetone. Subsequently, the resulting polymer was washed several times with a large excess of acetone and dried in a vacuum oven at 60° C. for 24 hours.

Elemental analysis shows that this polyampholyte or intramolecular complex contains 90.5 mole % acrylamide, 1.86 mole % sodium styrene sulfonate, and 7.64 mole % methacrylamidopropyltrimethylammoniumstyrene sulfonate complex.

Table I shows the effectiveness of the acrylamide-based polyampholyte as a viscosifier and gel strength additive for particulate-free, water-based muds. The data show that muds containing salt can be treated with the intrapolymer complex to enhance both the viscosity and gel strength characteristics. These desirable properties are maintained after subjecting the mud to high temperature (400° F.). In addition, the data show that the acrylamide-based polyampholyte is not very effective as a viscosifier and gel strength additive for water-based muds containing fresh water.

TABLE I

Rheological Properties of Several Particulate-Free Water-Based Muds Containing an Acrylamide-Based Polyampholyte

| Designation | Weight Percent[a] | Water | 600[b] | 300[c] | PV[d] | YP[e] | Gel[f] | Temp, °F. |
|---|---|---|---|---|---|---|---|---|
| 1A | 1.5 | Fresh | 19 | 11 | 8 | 3 | 4–4 | 70 |
| 1B | 1.5 | Fresh | 16 | 10 | 6 | 4 | 2–3 | 150 |
| 1C | 1.5 | Fresh | 23 | 12 | 11 | 1 | 4–4 | 400 |
| 2A | 1.5 | Salt[g] | 85 | 53 | 32 | 21 | 4–4 | 70 |
| 2B | 1.5 | Salt[g] | 80 | 50 | 30 | 20 | 4–4 | 150 |
| 2C | 1.5 | Salt[g] | 32 | 17 | 15 | 2 | 4–4 | 400 |

[a] Polymer concentration.
[b] Reading taken on a Fann ® rotational viscometer at 600 RPM.
[c] Reading obtained on a Fann ® rotational viscometer at 300 RPM.
[d] Plastic viscosity in centipose units: Difference between the 600 RPM and 300 RPM measurements.
[e] Yield point in units of lbs/100 ft.$^2$: Difference between 300 RPM measurement and plastic viscosity.
[f] First number is the initial value (expressed as lbs/100 ft.$^2$) on the viscometer at 3 RPM, while the second number corresponds to the value after 10 minutes has elapsed.
[g] Sodium chloride - 10 lb/gal.

EXAMPLE 2

Particulate-free, water-based muds were prepared using conventional laboratory techniques. The muds contain fresh or salt (sodium chloride) water and 1.5 wt. % acrylamide-based polyampholyte described in Example 1. The muds were aged at 70° F. to ensure physical homogeneity. Aliquots of the mud were aged in pressurized cells at 150° and 400° F. for 4 hours. The cells were cooled at room temperature, depressurized, and then the rheological properties of the mud were measured on a Fann Model 35 viscometer at 115° F. Muds containing 0.0 and 10 lb/gal of sodium chloride are presented in Table I.

Table II shows again the effectiveness of the acrylamide-based polyampholyte as a viscosifier and gel strength additive for particulate-free, water-based muds. The data show that muds containing salt (calcium chloride) can be treated with the intrapolymer complex to enhance both the viscosity and gel strength characteristics. These desirable properties are maintained after subjecting the mud to high temperature (400° F.). In addition, the data show that the acrylamide-based polyampholyte is not very effective as a viscosifier and gel strength additive for water-based muds containing fresh water. Furthermore, the data indicates that the polyampholyte performs to a better extent in calcium chloride solutions than in sodium chloride solutions. The improved performance is due essentially to the polymer's increased hydrodynamic volume in the calcium chloride mud system. Undoubtedly, the macromolecular complex is more compatible in the latter mud system, which is a very desirable feature.

TABLE II

Rheological Properties of Several Particulate-Free Water-Based Muds Containing an Acrylamide-Based Polyampholyte

| Designation | Weight Percent[a] | Water | 600[b] | 300[c] | PV[d] | YP[e] | Gels[f] | Temp, °F. |
|---|---|---|---|---|---|---|---|---|
| 1A | 1.5 | Fresh | 19 | 11 | 8 | 3 | 4–4 | 70 |
| 1B | 1.5 | Fresh | 16 | 10 | 6 | 4 | 2–3 | 150 |
| 1C | 1.5 | Fresh | 23 | 12 | 11 | 1 | 4–4 | 400 |
| 3A | 1.5 | Salt[g] | 242 | 150 | 92 | 58 | 9–7 | 70 |
| 3B | 1.5 | Salt[g] | 226 | 139 | 87 | 52 | 5–6 | 150 |
| 3C | 1.5 | Salt[g] | 96 | 54 | 42 | 12 | 5–7 | 400 |
| 4A | 0.75 | Salt[g] | 87 | 51 | 36 | 15 | 3–3 | 70 |
| 4B | 0.75 | Salt[g] | 88 | 49 | 39 | 10 | 3–5 | 150 |
| 4C | 0.75 | Salt[g] | 31 | 19 | 12 | 5 | 4–4 | 400 |

[a] Polymer Concentration.
[b] Reading taken on a Fann ® rotational viscometer at 600 RPM.
[c] Reading obtained on a Fann ® rotational viscometer at 300 RPM.
[d] Plastic viscosity in centipose units: Difference between the 600 RPM and 300 RPM measurements.
[e] Yield point in units of lbs/100 ft.$^2$: Difference between the 300 RPM measurement and plastic viscosity
[f] First number is the initial value (expressed as lbs/100 ft.$^2$) on the viscometer at 3 RPM, while the second number corresponds to the value after 10 minutes has elapsed.
[g] Calcium chloride - 11.3 lbs/gal.

Finally, we observe a marked improvement in the rheological properties of the muds with an increase in the polymer concentration. This is readily observed in a direct comparison of 3A-C with 4A-C.

What is claimed is:

1. A drilling mud which comprises:
   (a) salt water having about 0.1 to about 50 grams of salt per 100 ml. of water;
   (b) about 4 to about 30 lbs/bbl of clay;
   (c) about 1 to about 30 lbs/bbl of a lignosulfonate;
   (d) weighting material of sufficient quantity necessary to achieve the desired density;
   (e) about 0.25 to about 5 lbs/bbl of a terpolymer having the formula:

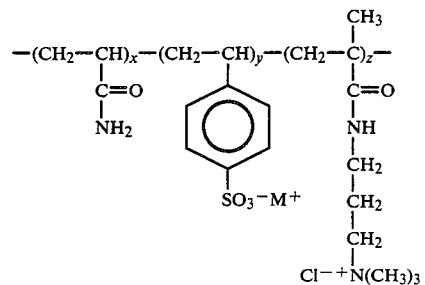

wherein x is about 40 to about 98 mole %, y is about 1 to about 50 mole %, z is about 1 to about 50 mole percent, wherein y and z are less than 60 mole %, and M is selected from the group consisting of amines and a metallic cation being selected from the group consisting of lead, iron, aluminum, Groups IA, IIA, IB and II of the Periodic Table of Elements, the molecular weight of said terpolymer as measured by intrinsic viscosity being $1 \times 10^3$ to $5 \times 10^6$; and (f) base of sufficient quantity to adjust the pH of the water-based drilling mud to about 10 to about 10.5.

2. A water-based drilling mud according to claim 1 wherein said clay is Bentonite.

3. A water-based drilling mud according to claim 1 wherein said base is sodium hydroxide.

4. A water-based drilling mud according to claim 1 wherein M is sodium.

5. A drilling mud which comprises:
   (a) salt water having about 0.1 to about 50 grams of salt per 100 grams of water; and
   (b) about 0.25 to about 15 lbs/bbl of the acrylamide-based polyampholyte containing low to moderate levels of anionic and cationic groups to increase the viscosity of said drilling mud, said terpolymer containing acrylamide monomer units and having about 1 to about 50 mole % of the charged monomer units, said terpolymer possessing unequal molar ratio of anionic and cationic monomers, said anionic monomer being sodium styrene sulfonate, and said cationic monomer being selected from the group consisting of methacrylamidopropyltrimethylammonium chloride, dimethyldiallylammonium chloride, diethyldiallylammonium chloride, 2-methacryloxy-2-ethyltrimethylammonium chloride, trimethylmethacryloxethylammonium methosulfate, 2-acrylamido-2-methylpropyltrimethylammonium chloride, and vinylbenzyltrimethylammonium chloride.

* * * * *